United States Patent
Okamoto et al.

(10) Patent No.: US 8,629,933 B2
(45) Date of Patent: Jan. 14, 2014

(54) CAMERA SYSTEM

(75) Inventors: Mitsuyoshi Okamoto, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 250 days.

(21) Appl. No.: 13/126,218

(22) PCT Filed: Oct. 28, 2009

(86) PCT No.: PCT/JP2009/005698
§ 371 (c)(1),
(2), (4) Date: Jul. 8, 2011

(87) PCT Pub. No.: WO2010/050200
PCT Pub. Date: May 6, 2010

(65) Prior Publication Data
US 2011/0261251 A1 Oct. 27, 2011

(30) Foreign Application Priority Data
Oct. 30, 2008 (JP) ................................. 2008-279423

(51) Int. Cl.
G03B 13/00 (2006.01)
H04N 5/232 (2006.01)
H04N 5/228 (2006.01)

(52) U.S. Cl.
USPC ........ 348/356; 348/222.1; 348/345; 348/349; 348/353; 348/354

(58) Field of Classification Search
USPC .................. 348/207.99, 222.1, 335–356; 396/89–131
See application file for complete search history.

(56) References Cited

U.S. PATENT DOCUMENTS

| | | | | |
|---|---|---|---|---|
| 4,894,676 A | * | 1/1990 | Ohnuki et al. | ............... 396/135 |
| 5,066,968 A | | 11/1991 | Suzuki et al. | |
| 5,206,677 A | * | 4/1993 | Onuki et al. | .................... 396/82 |
| 5,249,058 A | * | 9/1993 | Murata et al. | ................. 348/354 |

(Continued)

FOREIGN PATENT DOCUMENTS

| | | |
|---|---|---|
| JP | 2-093441 | 4/1990 |
| JP | 7-135596 | 5/1995 |

(Continued)

OTHER PUBLICATIONS

Translation of the International Preliminary Report on Patentability (PCT/IB/338) mailed on Jun. 16, 2011 with PCT/IB/373 & PCT/ISA/237 for corresponding application PCT/JP2009/005698.

(Continued)

*Primary Examiner* — Michael Osinski
(74) *Attorney, Agent, or Firm* — Panasonic Patent Center

(57) ABSTRACT

A camera system includes an interchangeable lens and a camera body. The camera body includes an image data generating unit for capturing a subject image to generate image data, a detecting unit for detecting a contrast value of an image represented by the image data generated by the image data generating unit, and a signal generating unit for generating a control signal controlling the driving unit. In an autofocus control, the signal generating unit generates the control signal controlling the driving unit to drive the focus lens at a first speed until a predetermined time elapses after the first detecting unit starts to detect the contrast value of the image and to drive the focus lens at a second speed higher than the first speed after the predetermined time elapses.

5 Claims, 6 Drawing Sheets

(56) References Cited

U.S. PATENT DOCUMENTS

| | | | |
|---|---|---|---|
| 5,574,502 A * | 11/1996 | Haruki | 348/347 |
| 5,757,429 A * | 5/1998 | Haruki | 348/354 |
| 2002/0109784 A1 | 8/2002 | Suda et al. | |
| 2005/0031332 A1* | 2/2005 | Kashiwaba et al. | 396/135 |
| 2006/0171699 A1* | 8/2006 | Nakai et al. | 396/125 |
| 2006/0203118 A1* | 9/2006 | Hirai | 348/345 |
| 2006/0232698 A1* | 10/2006 | Ito et al. | 348/345 |
| 2007/0196093 A1* | 8/2007 | Tanaka | 396/133 |
| 2007/0285557 A1* | 12/2007 | Wu | 348/345 |
| 2008/0002960 A1* | 1/2008 | Ito et al. | 396/125 |
| 2008/0007644 A1 | 1/2008 | Matsumoto | |
| 2008/0025715 A1* | 1/2008 | Ishii | 396/105 |
| 2008/0030594 A1* | 2/2008 | Terada | 348/221.1 |
| 2008/0199170 A1* | 8/2008 | Shibuno et al. | 396/125 |
| 2009/0028539 A1* | 1/2009 | Nakahara | 396/104 |
| 2013/0120645 A1* | 5/2013 | Uenishi | 348/353 |

FOREIGN PATENT DOCUMENTS

| | | |
|---|---|---|
| JP | 9-009132 | 1/1997 |
| JP | 9-023366 | 1/1997 |
| JP | 10-164424 | 6/1998 |
| JP | 11-069225 | 3/1999 |
| JP | 2001-141982 | 5/2001 |
| JP | 2001-272589 | 10/2001 |
| JP | 2006-64970 | 3/2006 |
| JP | 2008-015274 | 1/2008 |
| JP | 2008-102275 | 5/2008 |

OTHER PUBLICATIONS

International Search Report of PCT Application No. PCT/JP2009/005698, dated Dec. 27, 2009.

* cited by examiner

CAMERA SYSTEM

TECHNICAL FIELD

The present technical field relates to a camera system including a camera body and an interchangeable lens, and particularly to a camera system that enables a contrast type autofocus control.

BACKGROUND ART

Patent Document 1 discloses an autofocus camera that can control a focusing operation automatically. This autofocus camera can drive a motor at a low speed until a driving amount of the motor reaches a preset value.

Patent Document 1: JP 63-197925 A

SUMMARY

The autofocus camera disclosed in Patent Document 1 is based on a phase-difference type autofocus control, and Patent Document 1 does not disclose an art that heightens speed and accuracy of autofocus control in a camera that performs a contrast type autofocus control.

It is an object to provide a camera system that performs an contrast type autofocus control accurately at a comparatively high speed.

A first aspect provides a camera system including an interchangeable lens and a camera body. The interchangeable lens includes a focus lens and a driving unit configured to drive the focus lens. The camera body includes: an image data generating unit configured to capture a subject image to generate image data; a first detecting unit configured to detect a contrast value of an image represented by the image data generated by the image data generating unit; a signal generating unit configured to generate a control signal controlling the driving unit; and a transmitting unit configured to transmit the control signal generated by the signal generating unit to the interchangeable lens. In an autofocus control, the signal generating unit generates the control signal controlling the driving unit to drive the focus lens at a first sped until a predetermined time elapses after the first detecting unit starts to detect the contrast value of the image and to drive the focus lens at a second speed higher than the first speed after the predetermined time elapses.

A second aspect provides a camera body to which an interchangeable lens is mountable, the interchangeable lens having a focus lens and a driving unit configured to drive the focus lens. The camera body includes: an image data generating unit configured to capture a subject image to generate image data; a first detecting unit configured to detect a contrast value of an image represented by the image data generated by the image data generating unit; a signal generating unit configured to generate a control signal controlling the driving unit; and a transmitting unit configured to transmit the control signal generated by the signal generating unit to the interchangeable lens. In an autofocus control, the signal generating unit generates the control signal controlling the driving unit to drive the focus lens at a first speed until a predetermined time elapses after the first detecting unit starts to detect the contrast value of the image and to drive the focus lens at a second speed higher than the first speed after the predetermined time elapses.

A third aspect of the invention provides an autofocus control method for determining a focus position of a focus lens based on a contrast value of an image represented by image data generated by an imaging unit. The autofocus control method includes: detecting the contrast value of the image represented by the image data generated by the imaging unit while driving the focus lens; and driving the focus lens at a first speed until a predetermined time elapses after the contrast value of the image is started to be detected, and driving the focus lens at a second speed higher than the first speed after the predetermined time elapses, in driving of the focus lens.

According to the above aspect, after the predetermined time elapses from the star of an AF control, the driving speed of the focus lens is switched to a higher speed so that a contrast type autofocus control can be made accurately at a high speed.

DETAILED DESCRIPTION OF PREFERRED EMBODIMENT

1. First Embodiment 1-1. Configuration

Figure 1:
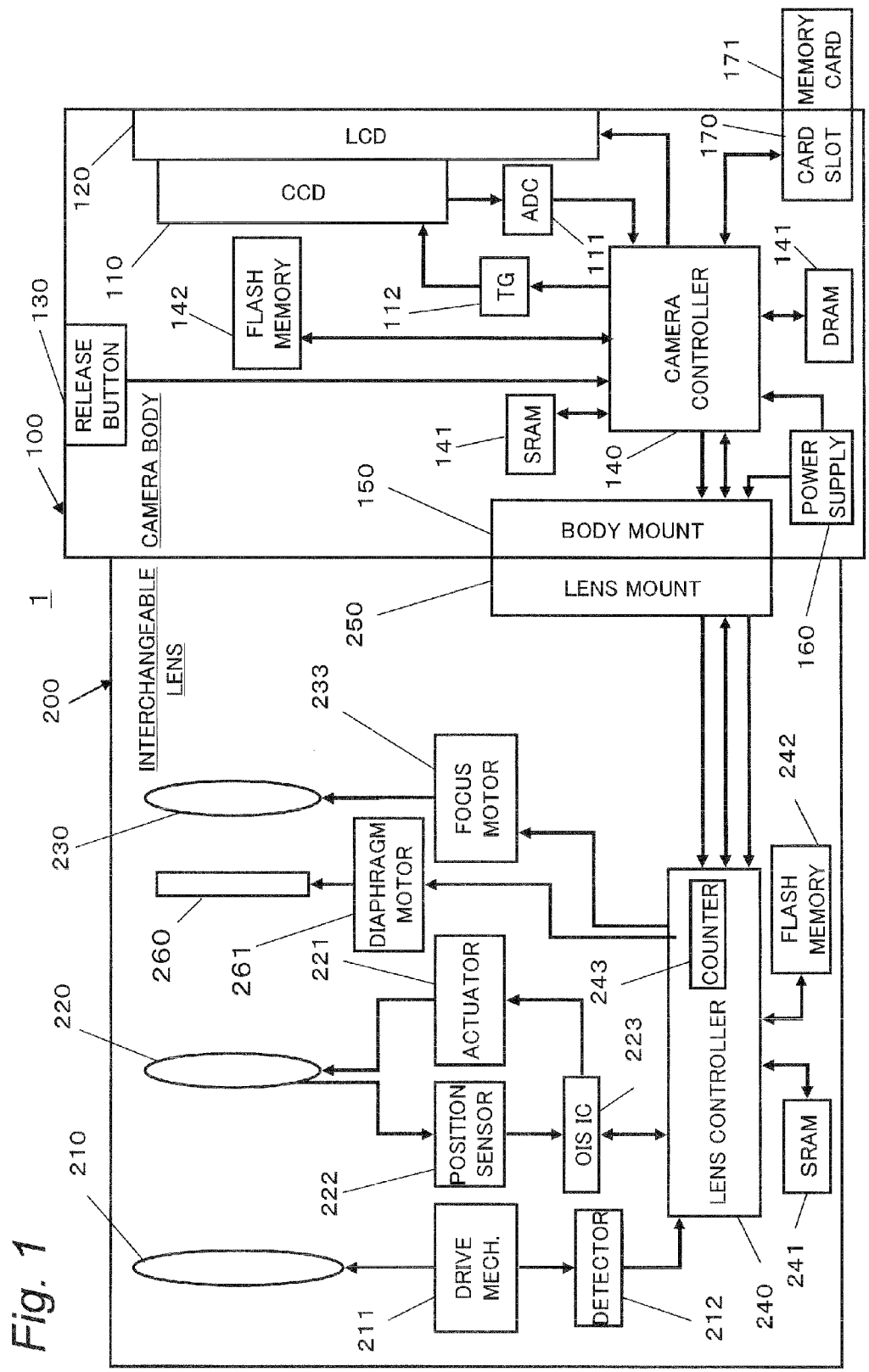
FIG. 1 is a block diagram illustrating a camera system according to an embodiment.

FIG. 1 is a block diagram illustrating a camera system according to a first embodiment. The camera system 1 has a camera body 100 and an interchangeable lens 200. The camera system 1 can perform a contrast type autofocus control by detecting an AF evaluation value of image data captured by a CCD image sensor 110 (an evaluation value for an autofocus operation, hereinafter, referred to as "a contrast value"). A camera system is described below that can perform the contrast type autofocus control accurately and at a comparatively high speed.

1-1-1 Configuration of Camera Body

The camera body 100 includes a CCD image sensor 110, a liquid crystal display (LCD) monitor 120, a camera controller 140, a body mount 150, a power supply 160 and a card slot 170.

The camera controller 140, controls operations of the respective parts including the CCD image sensor 110 to control the operation of the entire camera system 1 in response to a command from an operational member such as a release button 130. The camera controller 140 sends a vertical synchronizing signal to a timing generator 112. A DRAM 143 is used as a work memory for control and image processing operations performed by the camera controller 140. A flash memory 142 stores programs and parameters used for the control operation of the camera controller 140.

The CCD image sensor 110 generates an image signal from an optical signal containing an object image incident through the interchangeable lens 200. The generated image signal is converted into a digital signal, i.e. image data by an A/D converter 111. The image data generated by the A/D converter 111 is subjected to various image processing by the camera controller 140. The various image processing includes, for example, a gamma correction process, a white balance correction process, a defect correction process, a YC conversion process, an electronic zoom process, and an image compression process such as a JPEG compression process.

The CCD image sensor 110 operates at a timing controlled by the timing generator 112. The operations of the CCD image sensor 110 include an operation of capturing a still image, an operation of capturing a moving image, and an operation of capturing a through image. The through image is displayed on the LCD monitor 120 in real time after being captured by the CCD image sensor 110, but is not recorded in a memory card 171. The through image is mainly a moving image, and is displayed on the LCD monitor 120 to allow a user to determine a composition at the time of capturing a still image. This function of displaying a through image constituting a moving image (successive images) in real time on the LCD monitor 120 is called the live view function.

The LCD monitor 120 displays an image indicated by a display image data processed by the camera controller 140. The LCD monitor 120 can selectively display a moving image and a still image.

The card slot 170 can be loaded with the memory card 171 and writes/reads data to/from the memory card 171 under the control of the camera controller 140. The memory card 171 can store image data generated by the image processing operation of the camera controller 140. For example, the memory card 171 can store a JPEG image file. Also, the image data or the image file stored in the memory card 171 can be read from the memory card 171. The image data or the image file read from the memory card 171 is subjected to the image processing by the camera controller 140. For example, the camera controller 140 decompresses the image data or the image file obtained from the memory card 171 to generate display image data.

The power supply 160 supplies electric power to be consumed by the camera system 1. The power supply 160 may be, for example, a dry cell or a rechargeable battery. Alternatively, the power supplied from an external source may be supplied to the camera system 1 through a power cord.

The body mount 150 can be connected mechanically and electrically to a lens mount 250 of the interchangeable lens 200. The body mount 150 can transmit and receive commands and data to and from the interchangeable lens 200 through the lens mount 250. The body mount 150 transmits various control signals received from the camera controller 140 to the lens controller 240 through the lens mount 250. The body mount 150 supplies the power from the power supply 160 to the entire interchangeable lens 200 through the lens mount 250.

1-1-2 Configuration of Interchangeable Lens

The interchangeable lens 200 includes an optical system, the lens controller 240, and the lens mount 250. The optical system includes a zoom lens 210, an OIS lens 220, a diaphragm 260 and a focus lens 230.

The zoom lens 210 is a lens for changing the magnification of an object image formed by the optical system of the interchangeable lens 200. The zoom lens 210 is configured of one or plural pieces of lenses. A drive mechanism 211 includes a zoom ring and the like operable by a user, and moves the zoom lens 210 along an optical axis of the optical system in accordance with a rotating operation by a user. A detector 212 detects a drive amount of the drive mechanism 211. The lens controller 240 can grasp the zoom magnification in the optical system by obtaining a detection result of the detector 212.

The OIS lens 220 is a lens for correcting blur of the object image formed by the optical system of the interchangeable lens 200. The OIS lens 220 moves in such a direction as to cancel the blur of the camera system 1 to reduce the blur of the object image on the CCD image sensor 110. The OIS lens 220 is configured of one or plural pieces of lenses. An actuator 221 drives the OIS lens 220 in a plane perpendicular to the optical axis of the optical system under the control of an OIS IC 223. The actuator 221 can be realized by, for example, a magnet and a flat coil. A position detection sensor 222 detects the position of the OIS lens 220 in the plane perpendicular to the optical axis of the optical system. The position detection sensor 222 can be realized by, for example, a magnet and a Hall element. The OIS IC 223 obtains a detection result of a camera shake sensor (not shown) such as a gyrosensor from the lens controller 240. The OIS IC 223 controls the actuator 221 based on the detection results of the position detection sensor 222 and the camera shake sensor. Also, the OIS IC 223 transmits a signal indicating the state of an optical image blur correction process to the lens controller 240.

The diaphragm 260 is a member for regulating the amount of light passing through the optical system. The diaphragm 260 includes plural blades or the like, and by opening/closing an opening formed of the blades, can regulate the light amount. A diaphragm motor 261 is a drive unit for opening/closing the opening of the diaphragm 260.

The focus lens 230 changes a focus state of the object image formed on the CCD image sensor 110 in the optical system. The focus lens 230 is configured of one or plural lenses.

A focus motor 233, under the control of the lens controller 240, drives the focus lens 230 to go forward or backward along the optical axis of the optical system so that the focus state of the object image formed on the CCD image sensor 110 in the optical system can be changed. According to the first embodiment, the focus motor 233 is a stepping motor. Nevertheless, the focus motor 233 is not limited to such a motor but may be, for example, a servo motor or an ultrasonic motor.

The lens controller 240 controls operations of the OIS IC 223 and the focus motor 233 based on the control signal from the camera controller 140 to control the overall operation of the interchangeable lens 200. The lens controller 240 also receives a signal from the detector 212 and the OIS IC 223 and transmits the signal to the camera controller 140. The lens controller 240 transmits and receives a signal to and from the camera controller 140 through the lens mount 250 and body mount 150.

The lens controller 240 uses a SRAM 241 as a work memory on performing the control operation. A flash memory 242 stores programs and parameters used for the control operation of the lens controller 240.

1-1-3. Correspondence of Terms

The interchangeable lens 200 is one example of the interchangeable lens. The focus motor 233 is one example of a driving unit. The CCD image sensor 110 is one example of an image data generating unit. The camera controller 140 is an example of a detecting unit and a signal generating unit. The body mount 150 is one example of a transmitting unit.

1-2. Operation 1-2-1. Image Capturing Preparation Operation

Figure 2:
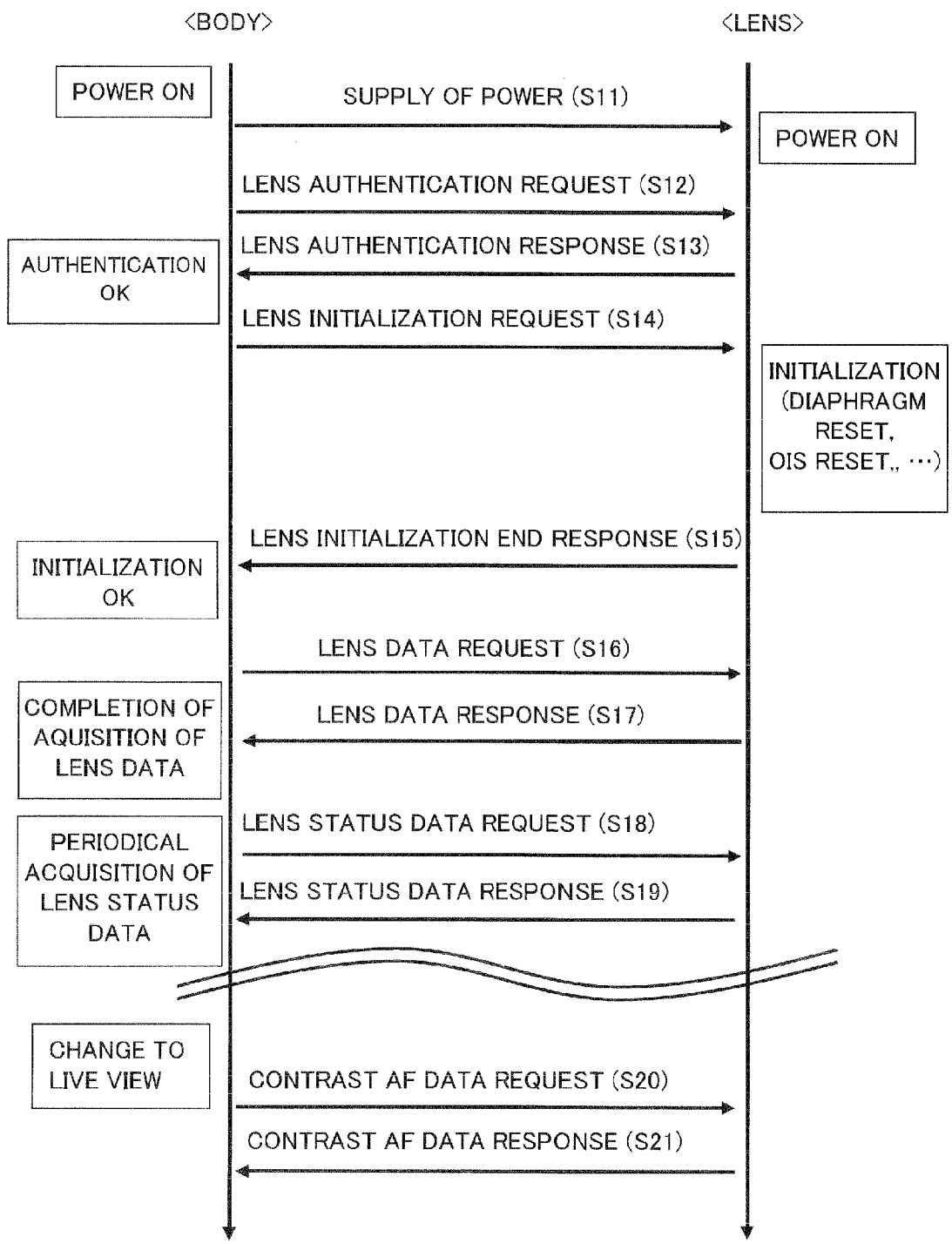
FIG. 2 is a flowchart for describing an image capturing preparation operation.

An operation of the camera system 1 for preparation for image capturing is described first. FIG. 2 is a diagram illustrating signal reception/transmission for explaining the image capturing preparation operation of the camera system 1.

When a user powers on the camera body 100 with the interchangeable lens 200 attached to the camera body 100, the power supply 160 supplies a power to the interchangeable lens 200 via the body mount 150 and the lens mount 250 (S11). The camera controller 140 requests authentication information of the interchangeable lens 200 from the lens controller 240 (S12). The authentication information of the interchangeable lens 200 includes information as to whether the interchangeable lens 200 is attached and information as to whether an accessory is attached. The lens controller 240 responds to the lens authentication request from the camera controller 140 (S13).

The camera controller 140 requests the lens controller 240 to perform an initializing operation (S14). In response to this, the lens controller 240 performs the initializing operation such as reset of a diaphragm, and reset of an OIS lens 220. Thereafter, the lens controller 240 returns information about completion of the lens initializing operation to the camera controller 140 (S15).

The camera controller 140 requests lens data from the lens controller 240 (S16). The lens data is stored in the flash memory 242. The lens controller 240 reads the lens data from the flash memory 242 and returns it to the camera controller 140 (S17). The lens data is a characteristic value specific to the interchangeable lens 200 such as a lens name, an F number, and a focal distance.

When the camera controller 140 obtains lens data of the interchangeable lens 200 attached to the camera body 100, the camera becomes in a state capable of capturing an image. In this state, the camera controller 140 periodically requests lens state data representing a state of the interchangeable lens 200 from the lens controller 240 (S18). The lens state data includes zoom magnification information of the zoom lens 210, position information of the focus lens 230, aperture value information, and the like. In response to this request, the lens controller 240 returns the requested lens state data to the camera controller 140 (S19).

In this state, the camera system 1 can operate in a control mode in which an image represented by image data generated by the CCD image sensor 110 is displayed as a through image on a liquid crystal display (LCD) monitor 120. This control mode is referred to as "a live view mode". In the live view mode, since the through image is displayed as a moving image on the LCD monitor 120, the user can determine a composition for taking a still image while viewing the LCD monitor 120. The user can select the live view mode or not. Beside the live view mode, as a control mode selectable by the user, there is a control mode in which an image generated based on the image data generated by the CCD image sensor 110 is displayed on an electronic view finder (not shown). A contrast type autofocus operation is suitable for the autofocus operation in the live view mode. In the live view mode, the image data is constantly generated by the CCD image sensor 110, and thus a contrast type Autofocus operation using such image data is easily carried out.

The camera controller 140 requests data for contrast AF from the lens controller 240 for the contrast type autofocus operation (S20). The data for contrast AF is necessary for the contrast type autofocus operation, and includes at least one of a focus driving speed, a focus shift amount, a magnification, and contrast AF availability information.

1-2-2. Contrast Autofocus (AF) Operation

Figure 3:
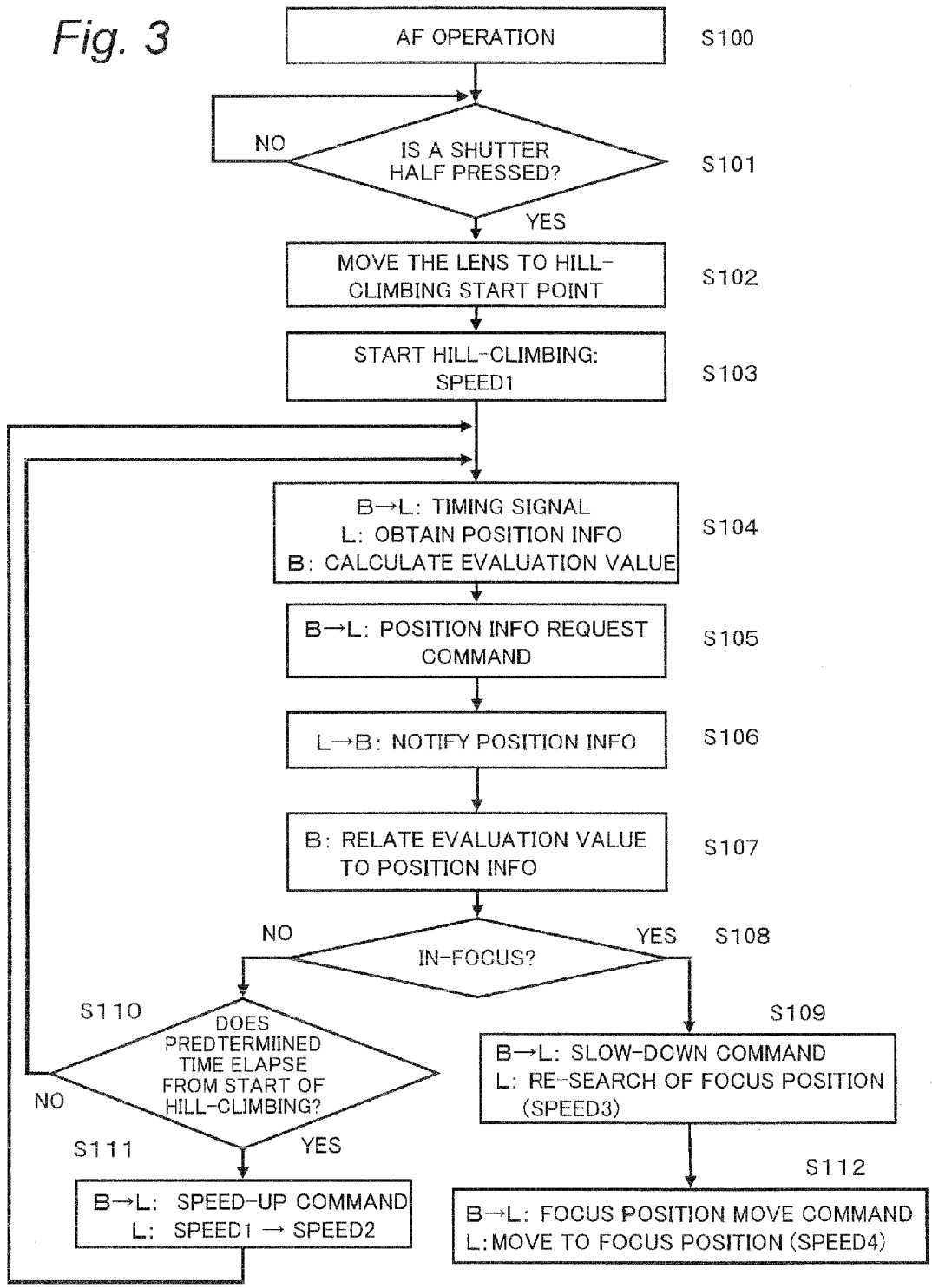
FIG. 3 is a flowchart for explaining a contrast AF operation.
Figure 4:
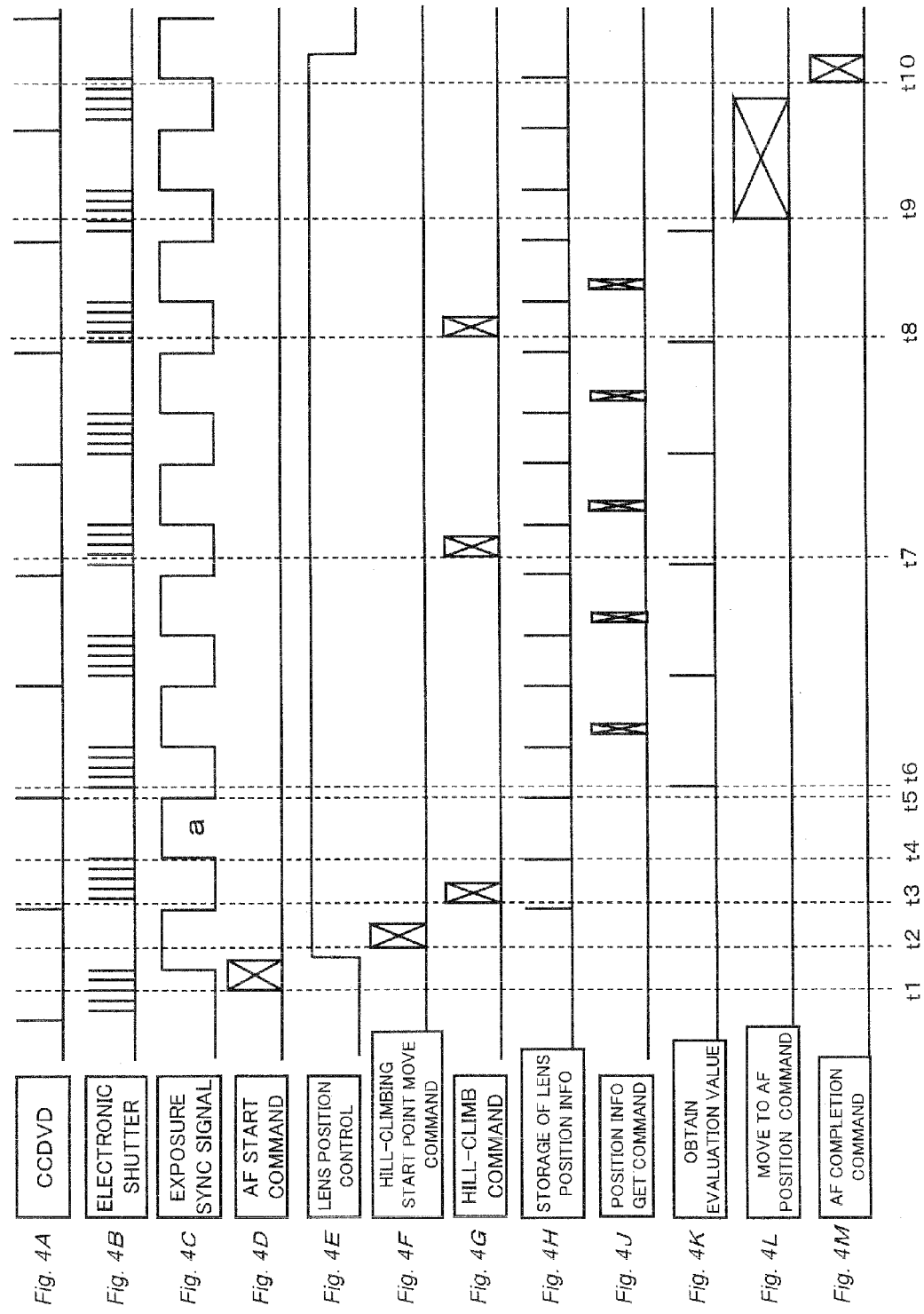
FIGS. 4A-4M depict a timing chart for explaining the contrast AF operation.

The autofocus operation in the camera system 1 with the image capturing preparation completed is described below with reference to FIGS. 3 and 4. The contrast AF operation is described. FIG. 3 is a flowchart for explaining the autofocus operation. FIG. 4 is a timing chart at the time of the autofocus operation.

The camera controller 140 is assumed to operate in the live view mode. In this state, the camera controller 140 periodically generates a vertical synchronizing signal (CCDVD) as shown in FIG. 4A. In parallel with this, the camera controller 140 generates an exposure synchronizing signal based on the vertical synchronizing signal as shown in FIG. 4C. The camera controller 140 knows in advance an exposure start timing and an exposure end timing based on the vertical synchronizing signal (CCDVD), and thus it can generate the exposure synchronizing signal. The camera controller 140 outputs the vertical synchronizing signal to a timing generator 112, and outputs the exposure synchronizing signal to the lens controller 240. The lens controller 240 obtains position information about the focus lens 230 in synchronization with the exposure synchronizing signal. This operation will be detailed later.

The timing generator 112 periodically generates a signal for reading the CCD image sensor 110 and a signal for driving an electronic shutter (see FIG. 4B) based on the vertical synchronizing signal. The timing generator 112 drives the CCD image sensor 110 based on the reading signal and the electronic shutter driving signal.

The CCD image sensor 110 reads pixel data generated by many photoelectric transducers (not shown) present in the CCD image sensor 110 into a vertical transferring unit (not shown) according to the reading signal. In the first embodiment, the reading signal matches with the vertical synchronizing signal, but this is not indispensable. That is to say, the vertical synchronizing signal does not have to match with the reading signal. In other words, it is a minimum requirement that the vertical synchronizing signal is synchronized with the reading signal.

The CCD image sensor 110 performs an electronic shutter operation according to the electronic shutter driving signal. This operation allows the CCD image sensor 110 to sweep out unnecessary electric charges. The electronic shutter driving signal is composed of a plurality of signals periodically transmitted for a short period as shown in FIG. 4B. For example, ten signals are transmitted as one group. While one group of the electronic shutter driving signals is transmitted, the CCD image sensor 110 performs one electronic shutter operation for each electronic shutter driving signal. When the number of signals included in one group of the electronic shutter driving signals is increased, the electric charges accumulated in the CCD image sensor 110 can be securely swept out, but a method for driving the CCD image sensor 110 becomes complicated.

In this manner, the CCD image sensor 110 sweeps out the electric charges according to the electronic shutter driving signal and reads pixel data into the vertical transferring unit (not shown) according to the reading signal. With this operation, an exposure operation is performed on image data for a through image during a period from the last signal of one group of the electronic shutter driving signals to the vertical synchronizing signal.

In the above state, the camera controller 140 monitors whether a release button 130 is half-pressed (S101). In FIG. 4, the release button 130 is half-pressed at time t1. As a result, the camera controller 140 transmits an AF start command to the lens controller 240 as shown in FIG. 4D. The AF start command is a command for instructing the start of the contrast type autofocus operation.

After the AF start command is transmitted, the camera controller 140 transmits a hill-climbing start point move command to the lens controller 240 at time t2. The hill-climbing start point move command is a command for instructing a position to which the focus lens 230 is moved when starting the contrast type autofocus operation and a direction to which the focus lens 230 is moved during detection of the AF evaluation value (contrast value). In response to this, the lens controller 240 controls the focus motor 233. The focus motor 233 moves the focus lens 230 to a position indicated by the hill-climbing start point move command under control of the lens controller 240 (S102).

The camera controller 140 transmits a hill-climbing start command to the lens controller 240 at time t3 (S103). The lens controller 240 drives the focus motor 233 according to the command from the camera controller 140 as indicated by the control shown in FIG. 4E.

The hill-climbing start command further instructs the interchangeable lens 200 in relation to a driving speed of the focus lens 230. Concretely, the hill-climbing start command instructs the interchangeable lens 200 to drive the focus lens 230 at a speed 1. The speed 1 is a speed which is lower than a speed at which a peak of the AF evaluation value (contrast value) is normally searched. This is because the focus lens 230 would be occasionally near the focus position at a start of the autofocus operation.

That is to say, when the focus lens 230 is driven at a high speed with the focus lens 230 positioned near the focus position at the start of the autofocus operation, the focus lens 230 might greatly depart from the focus position. In that case, after the focus lens 230 passing through the focus position, the focus lens 230 should be driven to the opposite direction at a low speed, and thus it takes a long time to search for the focus position. Further, in that case, in the live view mode, an unfocused image captured by the CCD image sensor 110 is displayed on the LCD monitor 120, thereby deteriorating image quality. Therefore, in this embodiment, the focus position is searched for at the low speed (speed 1) for a small period from a focus operation starting time point, so that the focus position can be detected for a short time when the focus position is near the focus lens 230. As a result, such a problem can be avoided.

Figure 5:
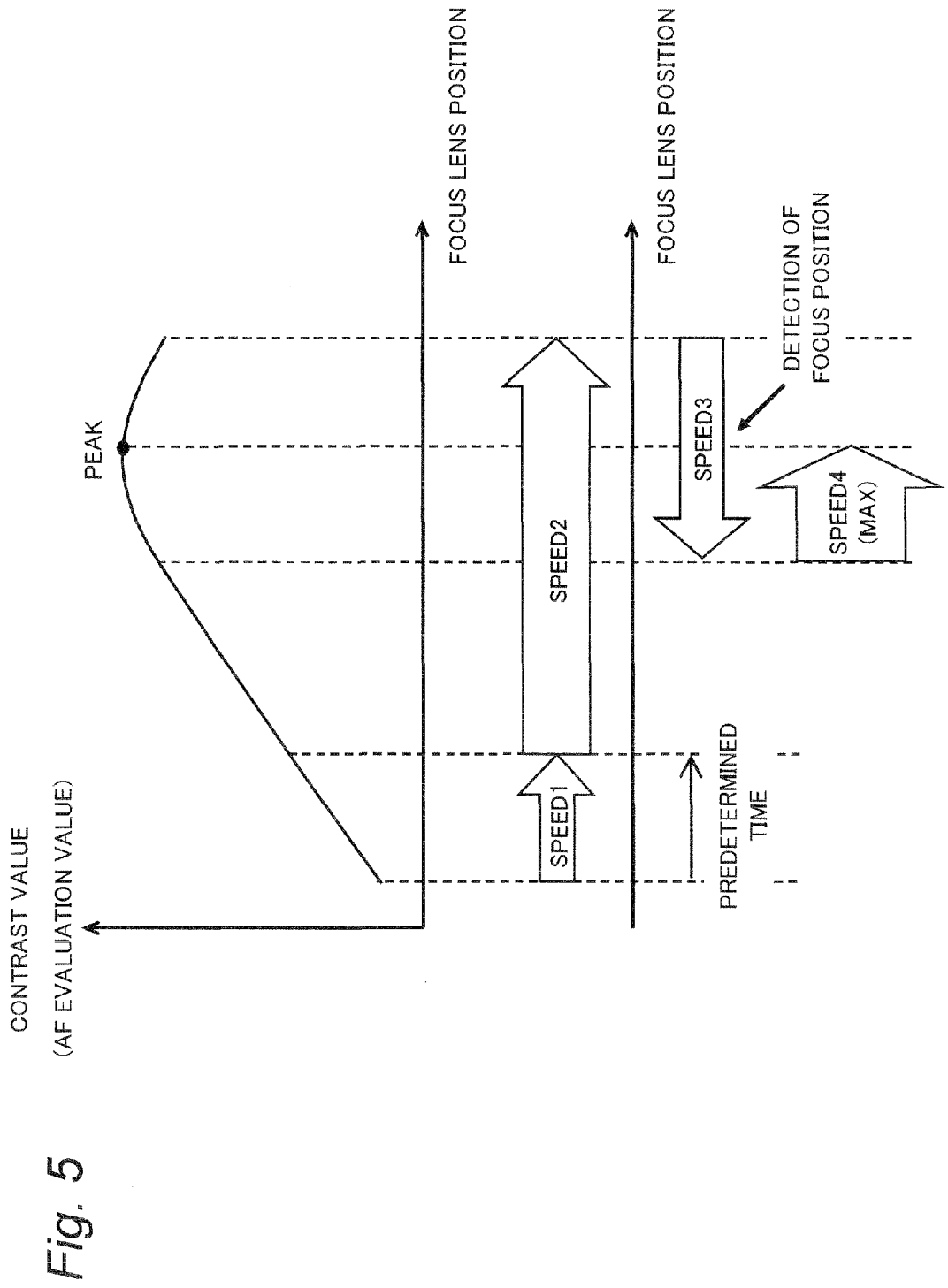
FIG. 5 is a diagram for explaining a change in a driving speed of a focus lens at the time of the contrast AF operation according to a first embodiment.

A change in the driving speed of the focus lens 230 during the contrast type autofocus control in the camera system 1 according to this embodiment will be described with reference to FIG. 5. FIG. 5 is a diagram for explaining the change in the driving speed of the focus lens 230 according to this embodiment. In this embodiment, when the contrast type autofocus control is started, the focus lens 230 starts to search for the peak of the AF evaluation value (contrast value) at the speed 1. When the peak of the AF evaluation value (contrast value) cannot be detected even if a predetermined time elapses after the start of the search, the speed of the focus lens 230 is changed from the speed 1 into a speed 2 higher than the speed 1, and then the search for the peak of the AF evaluation value (contrast value) continues. When the peak of the AF evaluation value (contrast value) is detected, the speed of the focus lens 230 is changed from the speed 2 into a speed 3 which is lower than the speed 2, and then the search for the peak of the AF evaluation value (contrast value) is started again. The speed 3 may be any speed lower than the speed 2 and may be the same as or different from the speed 1. By searching for the focus position at the speed 3 lower than the speed 2, the peak of the AF evaluation value (contrast value), namely, the focus position can be searched for more accurately. When the peak of the AF evaluation value (contrast value) is again detected, the focus lens 230 is moved to the focus position at the highest speed (speed 4).

Returning to FIG. 4, even after the hill-climbing start command is transmitted, the camera controller 140 continues to transmit the exposure synchronizing signal to the lens controller 240 at a predetermined cycle shown in FIG. 4C (S104).

Further, the lens controller 240 sequentially stores, in an SRAM 24, a pulse number of a counter 243 at the time when the exposure synchronizing signal is switched from OFF to ON and a pulse number of the counter 243 at the time when the exposure synchronizing signal is switched from ON to OFF (S104).

Further, the CCD image sensor 110 transmits image data that is generated by exposure for an exposure period to the camera controller 140 via the AD converter 111. The camera controller 140 calculates the AF evaluation value (contrast value) based on the received image data (S104). Concretely, the camera controller 140a obtains a brightness signal from the image data generated by the CCD image sensor 110, and integrates high-frequency components in an image of the brightness signal to obtain the AF' evaluation value (contrast value). The calculated AF evaluation value (contrast value) is related to the exposure synchronizing signal and is stored in an SRAM 141.

When the AF evaluation value (contrast value) is related to the exposure synchronizing signal so as to be saved in the SRAM 141, the camera controller 140 transmits a position information request command for requesting position information about the lens stored in the SRAM 241 from the lens controller 240 (S105).

When receiving the position information request command, the lens controller 240 transmits the position information of the focus lens 230 to the camera controller 140 (S106). In this embodiment, every time the CCD image sensor 110 captures one frame of image, the camera controller 140 transmits the position information request command (see FIG. 4J). Therefore, the lens controller 240 transmits two pieces of the position information of the lens stored in the SRAM 241 according to reception of the position information request command from the camera controller 140.

When obtaining the position information of the focus lens 230, the camera controller 140 relates the AF evaluation value (contrast value) stored in the SRAM 141 to the obtained position information (S107). The related information is stored in the SRAM 141. The AF evaluation value (contrast value) and the position information of the focus lens are related to the exposure synchronizing signal. For this reason, the camera controller 140 can store the AF evaluation value (contrast value) and the lens position information while relating them to each other. For example, the AF evaluation value (contrast value) calculated by using the image data exposed for a period "a" in FIG. 4C is related to an average value of a position of the focus lens 230 at time t4 and a position of the focus lens 230 at time t5 and is stored. Such an AF evaluation value (contrast value) is stored in the SRAM 141 at time t6 as shown in FIG. 4K.

After relating the AF evaluation value (contrast value) to the position information of the focus lens 230, the camera controller 140 determines whether the focus position of the focus lens 230 is extracted (S108). Concretely, the position of the focus lens 230 at which the AF evaluation value (contrast value) becomes a maximum value is extracted as the focus position.

When the focus position of the focus lens 230 cannot be extracted, the camera controller 140 determines whether a predetermined time elapses after transmitting the hill-climbing start command to the interchangeable lens 200 (S110). When it is determined that the predetermined time elapses, the camera controller 140 transmits the hill-climbing start command for heightening a driving speed of the focus lens 230 to the interchangeable lens 200 (time t7 at S111). When receiving this command, the lens controller 240 controls the focus motor 233 to drive the focus lens 230 at the speed 2 higher than the speed 1 (S111).

The reason for the above described control will be described. The focus motor 233 drives the focus lens 230 at the speed 1 as a comparatively low speed at the start of the hill climbing. However, when the peak of the AF evaluation value (contrast value) is not detected even though the search is performed at the speed 1 for the predetermined time, the peak position may be mostly far from the position of the focus lens 230 at the time of starting of AF. In such a case, when the peak of the AF evaluation value (contrast value) is searched for at a low speed, it takes much time to detect the peak of the AF evaluation value (contrast value). Therefore, in the camera system 1 according to this embodiment, when the predetermined time elapses after the search of the peak of the AF evaluation value (contrast value) starts, the driving speed of the focus lens 230 is changed from the speed 1 into the higher speed 2. This allows the time required for detecting the peak of the AF evaluation value (contrast value) to be shortened.

On the other hand, when the focus position of the focus lens 230 can be extracted, the camera controller 140 transmits a hill-climbing start command for reducing the driving speed of the focus lens 230 to the lens controller 240 (time t8, S109). The hill-climbing start command is to drive the focus lens 230 to a direction opposite to the last driving direction, and change the driving speed of the focus lens 230. That is to say, the speed is changed from the speed 1 or the speed 2 to the speed 3 (see FIG. 5).

When the focus position is detected by another search, the camera controller 140 transmits a focus position mover command to the lens controller 240 (time t9, S112). The focus position move command is a command for instructing a direction and a position to which the focus lens 230 is moved. Further, the focus position move command also instructs a speed of moving the focus lens 230 to the focus position. Concretely, the focus lens 230 is driven to the focus position at a speed 4. The speed 4 is the highest speed at which the focus lens can be driven. As a result, after the detection of the focus position, the focus lens 230 can be moved to the focus position at a high speed. When the movement to the focus position is completed, the camera controller 140 transmits an AF completion command to the lens controller 240 (time t10). In this way, the contrast type autofocus operation is completed.

In the camera system 1 according to the present embodiment, when the predetermined time elapses after the start of the AF operation, the driving speed of the focus lens is changed to a higher speed to search for the peak of the AF evaluation value (contrast value). As a result, the peak of the AF evaluation value (contrast value) can be detected at a high speed, and the focus lens 230 can be moved to the detected focus position accurately.

1-2-3. Conclusion of the Present Embodiment

The camera system 1 according to the present embodiment is a camera system including the interchangeable lens 200 and the camera body 100. The interchangeable lens 200 has the focus lens 230 and the focus motor 233 for driving the focus lens. The camera body 100 has the CCD image sensor 110 for capturing a subject image to generate image data, the camera controller 140 for detecting a contrast value of an image represented by the image data generated by the CCD image sensor 110, the camera controller 140 for generating a control signal for controlling the focus motor 233, and a body mount 150 for transmitting the control signal generated by the camera controller 140 to the interchangeable lens 200. The camera controller 140 generates a control signal for controlling the focus motor 233 in the autofocus control to drive the focus lens 230 at a first speed for a period from the start of detecting the contrast value of the image until the predetermined time elapses, and to drive the focus lens 230 at the second speed higher than the first speed after the predetermined time elapses.

With this configuration, the camera system 1 according to this embodiment can detect the peak of the AF evaluation value (contrast value) at a high speed and move the focus lens to the detected focus position accurately.

2. Second Embodiment

The camera system 1 according to the second embodiment is described below. Descriptions of the same or corresponding components and operations as or to those of the camera system 1 in the first embodiment are omitted.

Figure 6:
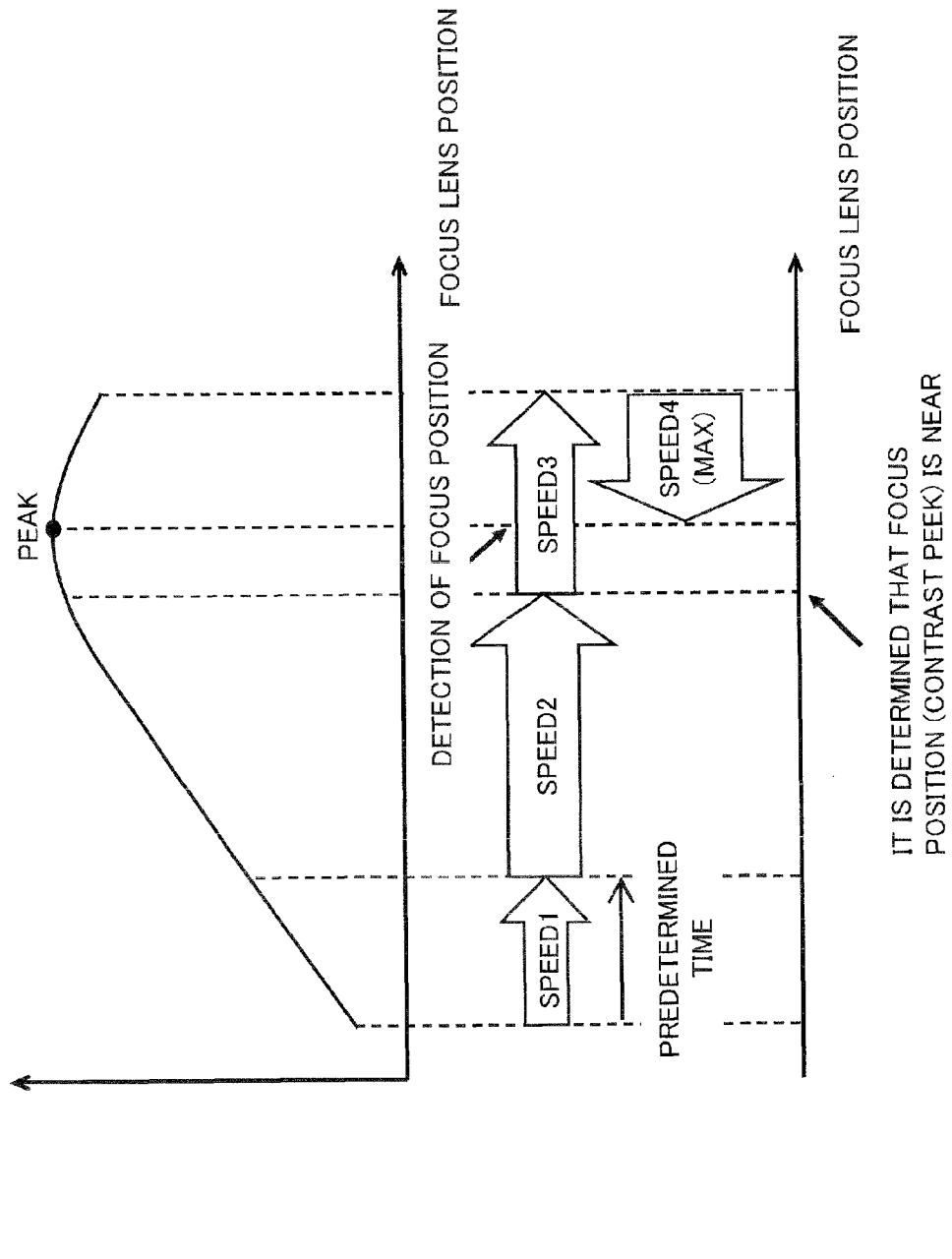
FIG. 6 is a diagram for explaining a change in a driving speed of a focus lens at the time of the contrast AF operation according to a second embodiment.

FIG. 6 is a diagram describing a change in the driving speed of the focus lens 230 in the camera system 1 according to this embodiment.

When the camera system 1 according to this embodiment performs the contrast autofocus control, the camera system 1 starts driving of the focus lens 230 at the speed 1. Thereafter, when the peak value of the AF evaluation value (contrast value) is not detected even after the predetermined time elapses, the camera system 1 changes the driving speed of the focus lens 230 from the speed 1 to the speed 2 higher than the speed 1 similarly to the first embodiment.

After the driving speed of the focus lens 230 is changed to the speed 2, the camera system 1 continuously detects the AF evaluation value (contrast value), and continuously detects a increase rate (change rate) of the AF evaluation value (contrast value). As a result of the detection, when it is determined that the position of the focus lens 230 comes close to a position which provides the peak of the AF evaluation value (contrast value), namely, the focus position, the camera system 1 changes the driving speed of the focus lens 230 from the speed 2 to the speed 3 lower than the speed 2, so that the actual peak of the AF evaluation value (contrast value), namely, the focus position can be detected more accurately. Thereafter, when the peak of the AF evaluation value (contrast value), namely, the focus position is detected, the camera system 1 reverses the driving direction of the focus lens 230 and moves the focus lens 230 to the focus position at the speed 4 as a maximum driving speed. When the increase rate of the AF evaluation value (contrast value) (change rate or inflection point) falls within a predetermined range, it can be determined that a distance between the position of the focus lens 230 and the position which provides the peak of the AF evaluation value (contrast value), that is the focus position, is within a predetermined distance.

In this manner, when it is determined that the focus lens 230 becomes close to the focus position in the contrast autofocus control, the camera system 1 according to this embodiment reduces the driving speed of the focus lens 230. This control can eliminate a step of searching again the focus position of the focus lens 230 at a low speed after the focus lens 230 passing through the focus position to improve detecting accuracy (that is, a number of reverse times of the driving direction of the focus lens 230 can be reduced). As a result, the speed of the contrast autofocus control can be improved.

The drive control for the focus lens 230 in this embodiment may be combined with the drive control described in the first embodiment. That is to say, in this embodiment, when approximation of the focus lens 230 to the peak position, that is, the focus position cannot be detected accurately, the drive control for the focus lens 230 described in the first embodiment may be made.

3. Other Embodiments

As described above, the first and second embodiments are explained. However, the embodiments are not limited to them. Other embodiments are described below.

According to the above embodiments, when the predetermined time elapses after the start of detection of the AF evaluation value (contrast value), the driving speed is changed from the speed 1 to the speed 2 only once. However, the number of times of changing the speed is not limited to one but the speed may be changed at a plurality of times. For example, in the above embodiments, when it is determined that the change rate of the AF evaluation value (contrast value) is small even though the time elapses, in consideration of at least one of the elapsed time after the change to the speed 2 and the change rate of the AF evaluation value (contrast value), the driving speed may be changed into a higher speed.

Further, regarding the change in the driving speed of the focus lens 230 (including one or plural change(s)) until the detection of the peak of the AF evaluation value (contrast value), the change rate of the driving speed may be made different between a moving image recording mode and a still image recording mode. In this case, the change rate (acceleration/deceleration) of the driving speed in recording a moving image is preferably smaller than that in recording a still image. For example, when a drivable speed level of the focus lens 230 in the interchangeable lens 200 is set in a plurality of steps (six steps), the driving speed in recording a still image is switched by two steps (for example, level 0→2→4), and the driving speed in recording a moving image is switched by one step (for example, level 1→2→3). The change rate of the driving speed is made smaller at the time of recording a moving image, so that it becomes hard for a user to see a change in image quality caused by the change in the driving speed of the focus lens 230 as much as possible. At the time of recording a moving image, a (controllable) range of the change in the driving speed is set to only the levels 0 to 3 in view of a driving sound. On other hand, at the time of recording a still image, the range of the change in the driving speed may be set to the entire range from the level 0 to 5.

TABLE 1

| Speed Level | Driving Speed |
|---|---|
| 0 | 10 |
| 1 | 20 |
| 2 | 40 |
| 3 | 80 |
| 4 | 160 |
| 5 | 320 |

The above embodiments disclose the following concept of the camera system. The camera system includes the interchangeable lens 200 and the camera body 100. The interchangeable lens 200 includes the focus lens 230 and the focus motor 233 for driving the focus lens 230. The camera body 100 includes the CCD image sensor 110 for capturing a subject image to generate image data, the camera controller 140 for detecting the contrast value of the image represented by the image data generated by the CCD image sensor 110, the camera controller 140 for generating a control signal controlling the focus motor 233, and the body mount 150 for transmitting the control signal to the interchangeable lens 200. The camera controller 140 changes the driving speed of the focus lens 230 based on a predetermined condition in the autofocus control. In this case, the camera controller 140 makes a method for changing the driving speed of the focus lens 230 in the autofocus control different between recording of a moving image and recording of a still image. The predetermined condition is, for example, the elapsed time from the start of the detection of the contrast value of the image data or detection/non-detection of the peak of the contrast value of the image data.

Further, in the switch of the driving speed of the focus lens 230 until detection of the peak of the AF evaluation value (contrast value) (one or a plurality of switches), the driving speed of the focus lens 230 may be switched in consideration of a residual move distance of the focus lens 230 in addition to the elapsed time from the start of the detection. That is to say, even though the predetermined time elapses, the driving speed may not be changed when the residual move distance is smaller than a predetermined value. This allows the peak of the AF evaluation value (contrast value) or the like to be detected accurately at a low speed for the residual distance. In another manner, the change rate of the driving speed may be changed according to the residual more distance. For example, the longer the residual move distance is, the larger the change rate of the driving speed may be. This allows time required for the AF operation with the long move distance of the focus lens to be shortened.

Further, in the switch of the driving speed of the focus lens 230 until detection of the peak of the AF evaluation value (contrast value) (one or a plurality of switches), the driving speed of the focus lens 230 may be changed based on the change rate of the AF evaluation value (contrast value). For example, even though the predetermined time elapses after start of detection of the peak of the AF evaluation value (contrast value), the driving speed may be prevented from increasing when the change rate of the AF evaluation value (contrast value) is relatively large. In another manner, when the change rate of the AF evaluation value (contrast value) becomes larger than the predetermined value after the driving speed of the focus motor 233 is increased, the driving speed of the focus motor 233 may be decreased. This is because it is considered that the peak of the AF evaluation value (contrast value) nears when the change rate of the AF evaluation value (contrast value) is large.

As the camera system according to the above embodiments, the camera body that does not have a movable mirror is illustrated, but the camera body may have a movable mirror or a prism for separating a subject image. In another manner, such a movable mirror may be provided not in the camera body but in an adaptor.

In the above embodiments, the CCD image sensor is illustrated as an imaging device, but an imaging device is not limited to this. An imaging device may be, for example, a CMOS image sensor or an NMOS image sensor.

Industrial Applicability

The embodiments are useful for the imaging apparatuses that can make the contrast autofocus control, such as a digital still camera and a digital video camera.

| Description of Reference Signs | |
|---|---|
| 100 | camera body |
| 110 | CCD image sensor |
| 111 | AD converter |
| 112 | timing generator |
| 120 | Liquid crystal display (LCD) monitor |
| 130 | Release button |
| 140 | Camera controller |
| 141 | SRAM |
| 142 | flash memory |
| 143 | DRAM |
| 150 | Body mount |
| 160 | Power supply |
| 170 | Card slot |

-continued

| | Description of Reference Signs |
|---|---|
| 171 | Memory card |
| 200 | Interchangeable lens |
| 211 | Zoom lens |
| 212 | detector |
| 220 | OIS lens |
| 221 | Actuator |
| 222 | position detection sensor |
| 223 | OIS IC |
| 230 | Focus lens |
| 233 | Focus motor |
| 240 | Lens controller |
| 241 | SPAM |
| 242 | Flash memory |
| 243 | Counter |
| 250 | Lens mount |
| 260 | Diaphragm |
| 261 | Diaphragm motor |

The invention claimed is:

1. A camera system comprising an interchangeable lens and a camera body,
the interchangeable lens comprising:
a focus lens; and
a driving unit configured to drive the focus lens,
the camera body comprising:
an image data generating unit configured to capture a subject image to generate image data;
a first detecting unit configured to detect a contrast value of an image represented by the image data generated by the image data generating unit;
a signal generating unit configured to generate a control signal used for controlling the driving unit; and
a transmitting unit configured to transmit the control signal generated by the signal generating unit to the interchangeable lens,
wherein in an autofocus control, the signal generating unit generates the control signal for controlling the driving unit to drive the focus lens at a first speed until a predetermined time elapses after the first detecting unit starts to detect the contrast value of the image and to drive the focus lens at a second speed higher than the first speed only when the first detecting unit does not detect a peak of the contrast value before the predetermined time elapses after the first detecting unit starts to detect the contrast value of the image, and further comprising a second detecting unit configured to detect that a position of the focus lens is a predetermined distance from an in-focus position when a rate of increase of the contrast value is within a predetermined range before the position of the focus lens runs past the in-focus position, wherein the signal generating unit generates a control signal for controlling the driving unit to drive the focus lens at a third speed lower than the second speed after the second detecting unit detects that the position of the focus lens is at the predetermined distance from the in-focus position.

2. The camera system according to claim 1, wherein a method for changing a driving speed of the focus lens in the autofocus control implemented by the signal generating unit is different between recording of a moving image and recording of a still image.

3. A camera body to which an interchangeable lens is mountable, the interchangeable lens having a focus lens and a driving unit configured to drive the focus lens, the camera body comprising:
an image data generating unit configured to capture a subject image to generate image data;
a first detecting unit configured to detect a contrast value of an image represented by the image data generated by the image data generating unit;
a signal generating unit configured to generate a control signal used for controlling the driving unit; and
a transmitting unit configured to transmit the control signal generated by the signal generating unit to the interchangeable lens,
wherein in an autofocus control, the signal generating unit generates the control signal for controlling the driving unit to drive the focus lens at a first speed until a predetermined time elapses after the first detecting unit starts to detect the contrast value of the image and to drive the focus lens at a second speed higher than the first speed only when the first detecting unit does not detect a peak of the contrast value before the predetermined time elapses after the first detecting unit starts to detect the contrast value of the image, and further comprising a second detecting unit configured to detect that a position of the focus lens is a predetermined distance from an in-focus position when a rate of increase of the contrast value is within a predetermined range before the position of the focus lens runs past the in-focus position, wherein the signal generating unit generates a control signal for controlling the driving unit to drive the focus lens at a third speed lower than the second speed after the second detecting unit detects that the position of the focus lens is at the predetermined distance from the in-focus position.

4. The camera body according to claim 3, wherein a method for changing a driving speed of the focus lens in the autofocus control implemented by the signal generating unit is different between recording a moving image and recording a still image.

5. An autofocus control method for determining a focus position of a focus lens based on a contrast value of an image represented by image data generated by an imaging unit, the autofocus control method comprising:
detecting the contrast value of the image represented by the image data generated by the imaging unit while driving the focus lens; and
driving the focus lens at a first speed until a predetermined time elapses after the contrast value of the image is started to be detected, and driving the focus lens at a second speed higher than the first speed only when a peak of the contrast value is not detected before the predetermined time elapses after the contrast value of the image is started to be detected, and the autofocus control method further comprising detecting that a position of the focus lens is a predetermined distance from an in-focus position when a rate of increase of the contrast value is within a predetermined range before the position of the focus lens runs past the in-focus position, and generating a control signal for driving the focus lens at a third speed lower than the second speed after detecting that the position of the focus lens is at the predetermined distance from the in-focus position.

* * * * *